No. 791,914. PATENTED JUNE 6, 1905.
M. R. R. JONES.
BICYCLE SUPPORT.
APPLICATION FILED NOV. 22, 1904.

Witnesses
Forrest S. Smith
C. H. Griesbauer

Inventor
Milton R. R. Jones
by H. B. Willson
Attorney

No. 791,914. Patented June 6, 1905.

UNITED STATES PATENT OFFICE.

MILTON R. R. JONES, OF JACKSON, MISSISSIPPI.

BICYCLE-SUPPORT.

SPECIFICATION forming part of Letters Patent No. 791,914, dated June 6, 1905.

Application filed November 22, 1904. Serial No. 233,848.

*To all whom it may concern:*

Be it known that I, MILTON R. R. JONES, a citizen of the United States, residing at Jackson, in the county of Hinds and State of Mississippi, have invented certain new and useful Improvements in Bicycle-Supports; and I do declare the following to be a full, clear, and exact description of the invention, such as will enable others skilled in the art to which it appertains to make and use the same.

This invention relates to improvements in bicycle-supports.

The object of the invention is to provide a supporting-rod whereby a bicycle may be supported when at rest and means whereby said rod may be quickly swung into and out of operative position.

With the above and other objects in view the invention consists of certain novel features of construction, combination, and arrangement of parts, as will be hereinafter described and claimed.

Figure 1:
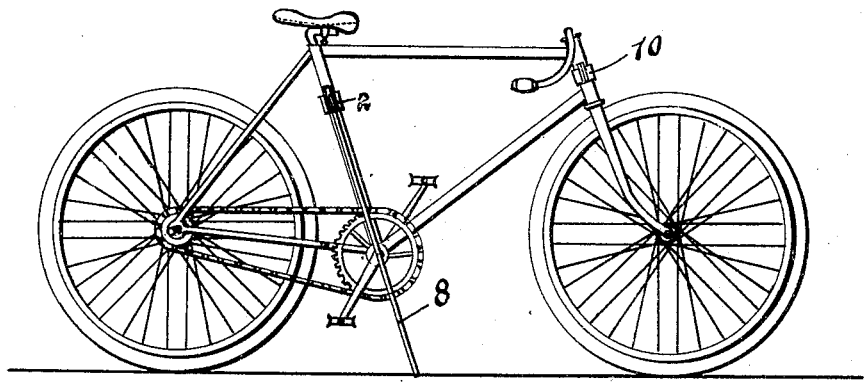
Figure 2:
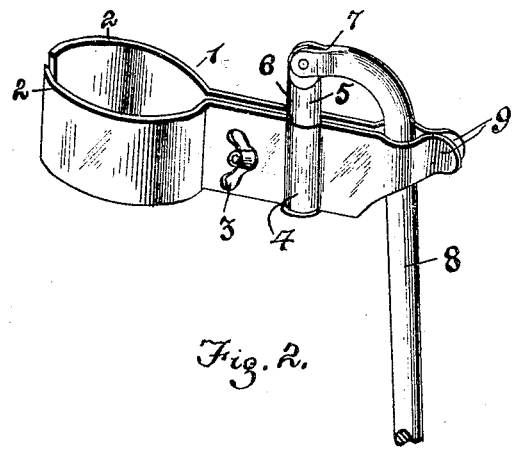
Figure 3:
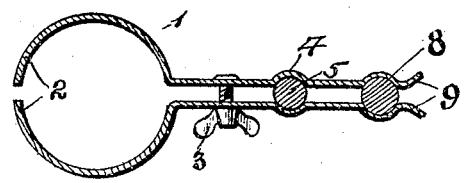

In the accompanying drawings, Figure 1 is a side elevation of a bicycle, showing the application of the invention thereto. Fig. 2 is a detail perspective view of a supporting-rod and its attaching device when removed from the bicycle, and Fig. 3 is a horizontal sectional view through the attaching device and the upper end of the supporting-rod.

Referring more particularly to the drawings, 1 denotes an attaching-bracket which consists of two plates, on one end of which are formed semicircular clamping members 2. Said members are adapted to be engaged with the seat-post of the bicycle-frame and to be clamped onto the same by means of a thumb-screw 3, which is screwed to threaded apertures formed in said bracket-plates.

The laterally-projecting portions of the clamping-plates are provided with semicircular bent portions 4, which when said plates are clamped together form a bearing-socket in which is journaled a swiveled pin or bolt 5, having on its upper end an enlarged head 6. To the upper end of the head 6 is pivotally connected an upper bifurcated curved end 7 of a supporting rod or bar 8. On the outer ends of the bracket-plates are formed outwardly-curved upwardly-projecting fingers 9, which form a clip to receive the supporting-bar 8 when the same is in a lowered or operative position, thereby holding said bar rigidly and preventing the turning of the same and the swiveled pin or bolt 5 in its socket. When the supporting bar or rod 8 is not in use, the same is swung to a substantially horizontal position along the side of the bicycle-frame and supported at its outer end in a suitable bracket 10, which is attached to the head or other portion of said frame.

By providing the upper end of the supporting rod or bar with a hinged and pivoted connection with the bracket-arms the same may be swung in any direction, thus enabling the rod to be lifted out of the clip-finger 9 and swung laterally into engagement with the support or bracket 10, secured to the head of the bicycle-frame, thus supporting said rod in an out-of-the-way position from which it may be quickly swung laterally and downwardly to form a support for the bicycle. The engagement of said bar with the clip-fingers when in a lowered or operative position will prevent the same and the bar 5 from turning in the socket of the bracket-plates, thereby supporting the bicycle firmly and rigidly while the same is at rest.

By means of the clamping portions of the bracket and the set-screw 3 said bracket-plates may be firmly attached to any portion of the bicycle-frame and hold the supporting bar or rod in position.

From the foregoing description, taken in connection with the accompanying drawings, the construction and operation of the invention will be readily understood without requiring a more extended explanation.

Various changes in the form, proportion, and the minor details of construction may be resorted to without departing from the principle of sacrificing any of the advantages of this invention.

Having thus described my invention, what I claim as new, and desire to secure by Letters Patent, is—

1. A bicycle-support, consisting of an attaching-bracket formed of counterpart plates bent to form on one end clamping-jaws to engage the bicycle-frame, and on their opposite ends clip-fingers, a socket formed in said plates between said clamping-jaws and said clip-fingers, a headed swivel pin or bolt mounted in said socket, a supporting rod or bar hingedly connected to the head of said swivel-pin whereby said rod may be swung into and out of operative position, and means whereby said bar is supported in an inoperative position, substantially as described.

2. A bicycle-support consisting of an attaching-bracket formed of counterpart plates, bent to form on one end clamping-jaws to engage the bicycle-frame, and on their opposite ends clip-fingers, a socket formed in said plates between said clamping-jaws and said clip-fingers, a thumb-screw to clamp said plates onto said frame, a headed swivel pin or bolt mounted in said socket, a supporting rod or bar hingedly connected to the head of said swivel-bolt and adapted to engage said clip-fingers when in an operative position, and a bracket adapted to support said rod in an inoperative position, substantially as described.

In testimony whereof I have hereunto set my hand in presence of two subscribing witnesses.

MILTON R. R. JONES.

Witnesses:
A. P. PHILP,
O. V. JELKS.